United States Patent
Gatherer et al.

(10) Patent No.: US 11,334,355 B2
(45) Date of Patent: May 17, 2022

(54) MAIN PROCESSOR PREFETCHING OPERANDS FOR COPROCESSOR OPERATIONS

(71) Applicant: Futurewei Technologies, Inc., Plano, TX (US)

(72) Inventors: Alan Gatherer, Richardson, TX (US); Sushma Wokhlu, Frisco, TX (US); Peter Yan, Frisco, TX (US); Ywhpyng Harn, Milpitas, CA (US); Ashish Rai Shrivastava, Plano, TX (US); Tong Sun, Allen, TX (US); Lee Dobson McFearin, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 313 days.

(21) Appl. No.: 15/586,937

(22) Filed: May 4, 2017

(65) Prior Publication Data

US 2018/0321939 A1 Nov. 8, 2018

(51) Int. Cl.
*G06F 9/38* (2018.01)
*G06F 9/30* (2018.01)
(Continued)

(52) U.S. Cl.
CPC ............ *G06F 9/3016* (2013.01); *G06F 3/061* (2013.01); *G06F 3/0656* (2013.01); *G06F 3/0673* (2013.01); *G06F 9/3802* (2013.01); *G06F 9/383* (2013.01); *G06F 9/3877* (2013.01); *G06F 9/3881* (2013.01); *G06F 9/46* (2013.01); *G06F 12/0853* (2013.01); *G06F 12/0884* (2013.01); *G06F 13/16* (2013.01); *G06F 12/0859* (2013.01); *G06F 12/0868* (2013.01);
(Continued)

(58) Field of Classification Search
CPC ....... G06F 9/383; G06F 9/3877; G06F 9/3881
See application file for complete search history.

(56) References Cited

U.S. PATENT DOCUMENTS

| 5,123,095 | A | * | 6/1992 | Papadopoulos | ..... G06F 9/30032 708/520 |
|---|---|---|---|---|---|
| 5,185,871 | A | * | 2/1993 | Frey | ...................... G06F 9/3834 711/124 |

(Continued)

FOREIGN PATENT DOCUMENTS

CN 1652091 A 8/2005

*Primary Examiner* — Jacob Petranek
(74) *Attorney, Agent, or Firm* — Slater Matsil, LLP

(57) ABSTRACT

Technology for providing data to a processing unit is disclosed. A computer processor may be divided into a master processing unit and consumer processing units. The master processing unit at least partially decodes a machine instruction and determines whether data is needed to execute the machine instruction. The master processing unit sends a request to memory for the data. The request may indicate that the data is to be sent from the memory to a consumer processing unit. The data sent by the memory in response to the request may be stored in local read storage that is close to the consumer processing unit for fast access. The master processing unit may also provide the machine instruction to the consumer processing unit. The consumer processing unit may access the data from the local read storage and execute the machine instruction based on the accessed data.

11 Claims, 10 Drawing Sheets

(51) Int. Cl.
  *G06F 13/16* (2006.01)
  *G06F 12/0853* (2016.01)
  *G06F 9/46* (2006.01)
  *G06F 12/0884* (2016.01)
  *G06F 3/06* (2006.01)
  *G06F 12/0868* (2016.01)
  *G06F 12/0855* (2016.01)

(52) U.S. Cl.
  CPC ............ *G06F 2212/1008* (2013.01); *G06F 2212/1016* (2013.01); *G06F 2212/7203* (2013.01)

(56) References Cited

U.S. PATENT DOCUMENTS

| | | | | |
|---|---|---|---|---|
| 5,790,845 A * | 8/1998 | Shimada | ............... | G06F 9/3005 712/238 |
| 5,983,342 A * | 11/1999 | Tran | ............... | G06F 9/30036 712/218 |
| 6,002,881 A * | 12/1999 | York | ............... | G06F 9/30101 711/147 |
| 6,944,746 B2 * | 9/2005 | So | ............... | G06F 9/3861 375/E7.027 |
| 7,546,441 B1 * | 6/2009 | Ansari | ............... | G06F 9/30181 712/220 |
| 8,244,986 B2 | 8/2012 | Solihin | | |
| 8,447,957 B1 * | 5/2013 | Carrillo | ............... | G06F 9/3455 712/14 |
| 2004/0186960 A1 | 9/2004 | Poggio | | |
| 2006/0224831 A1 * | 10/2006 | Yoshikawa | ............... | G06F 12/0806 711/137 |
| 2011/0161634 A1 * | 6/2011 | Sakaguchi | ............... | G06F 9/30134 712/208 |
| 2012/0204005 A1 * | 8/2012 | Dockser | ............... | G06F 9/3814 712/205 |
| 2012/0204008 A1 * | 8/2012 | Dockser | ............... | G06F 9/382 712/208 |
| 2012/0303895 A1 | 11/2012 | Benhase et al. | | |
| 2013/0007046 A1 | 1/2013 | Baum et al. | | |
| 2014/0192069 A1 * | 7/2014 | Raikin | ............... | G06F 13/38 345/520 |
| 2016/0313994 A1 | 10/2016 | Scott et al. | | |

* cited by examiner

MAIN PROCESSOR PREFETCHING OPERANDS FOR COPROCESSOR OPERATIONS

BACKGROUND

Computer processors need data to operate on in order to, for example, execute program instructions. Typical computer architectures have a multi-level memory hierarchy. In addition to main memory, typically there are multiple levels of caches to provide faster access to data that is stored in main memory. For example, there may be cache levels such as L1 cache, L2 cache, L3 cache, etc. L1 cache typically has faster access, is smaller and more expensive than L2 cache. L2 cache typically has faster access, is smaller and more expensive than L3 cache, etc. When the computer processor needs data, it typically looks in the L1 cache first for the data. If the data is not in the L1 cache, then the L2 cache is searched, then L3 cache, etc.

As computation time becomes faster and faster, it is becoming more difficult to prevent the processor from having to wait for data to be accessed from somewhere in the memory hierarchy. Also, in many cases the data is shared by multiple computer processors. In this case, storing a copy of the data in L1 cache may not be a viable option.

Various techniques, such as speculative pre-fetching have been used to bring the data closer to the computer processor. However, such techniques result in additional hardware and cost.

SUMMARY

In a first embodiment, the present technology relates to an apparatus for executing a machine instruction, comprising master processing logic configured to at least partially decode the machine instruction to determine whether data is needed to execute the machine instruction; consumer processing logic coupled to the master processing logic; and storage that is accessible to the consumer processing logic. The master processing logic is configured to provide to the consumer processing logic at least a portion of the machine instruction. The master processing logic is configured to send a read request to memory for the data needed, wherein the read request indicates that the data is to be sent from the memory to the storage that is accessible to the consumer processing logic. The consumer processing logic is configured to access the data from the storage and to execute the machine instruction based on the accessed data.

A second embodiment in accordance with the first embodiment, further comprises a first-in, first-out (FIFO) buffer. The master processing logic is further configured to provide the at least a portion of the machine instruction to the FIFO buffer responsive to a determination that the data is needed and that the consumer processing logic is to execute the machine instruction. The consumer processing logic is configured to access the machine instruction from the FIFO buffer.

In a third embodiment in accordance with the first through second embodiments, the FIFO buffer has a depth that is configured to provide a delay such that the data for the machine instruction is in the storage by the time the consumer processing logic accesses the machine instruction from the FIFO buffer.

In a fourth embodiment in accordance with the first through third embodiments, the read request comprises a destination address.

In a fifth embodiment in accordance with the first through fourth embodiments, the read request comprises a destination type.

In a sixth embodiment in accordance with the first through fifth embodiments, the storage comprises read storage for storing the data from memory and write storage for storing data to be written from the consumer processing logic to memory.

In a seventh embodiment in accordance with the first through sixth embodiments, the consumer processing logic further comprises read storage management logic configured to read a destination address in a read response sent from the memory and store the data to the read storage when the destination address corresponds to an address of the consumer processing logic.

In an eighth embodiment in accordance with the first through seventh embodiments, the apparatus further comprises write storage management logic configured to remove data from the write storage after the data has been written to the memory.

In a ninth embodiment in accordance with the first through eighth embodiments, the apparatus further comprises a hazard logic configured handle hazards between the read storage and write storage.

In an tenth embodiment in accordance with the first through ninth embodiments, the master processing logic and the consumer processing logic are in one processor.

In an eleventh embodiment in accordance with the first through tenth embodiments the master processing logic resides on a first semiconductor die and the consumer processing logic resides on a second semiconductor die other than the first semiconductor die.

In a twelfth embodiment in accordance with the first through eleventh embodiments, the apparatus further comprises a clock generation circuitry configured to provide a first clock signal to the master processing logic and a second clock signal to the consumer processing logic, wherein the first clock signal has a frequency different from a frequency of the second clock signal.

A thirteenth embodiment is a method of executing a machine instruction. The method comprises fetching, by master processing logic, the machine instruction; decoding the machine instruction, at least partially, by the master processing logic; determining, by the master processing logic, that data is needed to execute the machine instruction; sending, by the master processing logic to a memory, a request to provide the data for executing the machine instruction to storage that is accessible to consumer processing logic; providing, by the master processing logic, at least a portion of the machine instruction to the consumer processing logic; receiving, from the memory, the data at the storage; and executing, by the consumer processing logic, the machine instruction using the data in the storage.

In a fourteenth embodiment in accordance with the thirteenth embodiment, the executing, by the consumer processing logic, the machine instruction comprises: executing the machine instruction after the data for the machine instruction arrives in the storage; and removing the data from the storage.

In a fifteenth embodiment in accordance with the tenth through fourteenth embodiments, the providing, by the master processing logic, at least a portion of the machine instruction to the consumer processing logic comprises: sending the at least a portion of the machine instruction to a first-in first-out (FIFO) buffer that is accessible to the consumer processing logic.

In a sixteenth embodiment in accordance with the tenth through fifteenth embodiments the sending, by the master processing logic to a memory, a request to provide the data for executing the machine instruction comprises: adding a destination address of the consumer processing logic to a read request packet.

In a seventeenth embodiment in accordance with the tenth through sixteenth embodiments the method further comprises receiving, by the consumer processing logic, a read response packet from the memory; wherein the read response packet comprises a destination address of the consumer processing logic.

In an seventeenth embodiment in accordance with the tenth through seventeenth embodiments the receiving, from the memory, the data at the storage comprises: accessing the destination address in the read response packet; and storing the data in the storage responsive to a determination that the destination address matches an identifier of the consumer processing logic.

A nineteenth embodiment is an apparatus for executing an instruction. The apparatus comprises a non-transitory memory storage comprising data, and one or more processors in communication to the memory. The one or more processors comprise master processing logic and at least one consumer processing logic. The master processing logic at least partially decodes the instruction to determine whether data is needed to execute the instruction; provides at least a portion of the instruction to one of the at least one consumer processing logic; and sends a read request to the memory for the data needed, wherein the read request indicates a destination address to where the data need to be sent. The at least one consumer processing logic receives a read response from the memory indicating the destination address to where the data need to be sent. The one of the at least one consumer processing logic receives data from the memory and executes the at least the portion of the instruction when the destination address is corresponding to an address of the one of the at least one consumer processing logic.

In a twentieth embodiment in accordance with the nineteenth embodiment each of the at least one consumer processing logic further comprises: a read storage for storing the data from memory; a write storage for storing data to be written to the memory; a first-in, first-out (FIFO) buffer that receives the at least a portion of the instruction from the master processing logic.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The present technology generally relates to providing data from memory to a processing unit, such as a computer processor. The computer processor may have an instruction set which comprises machine instructions that the computer processor recognizes and executes. To execute some of the machine instructions, the computer processor may need access to data stored in memory. If the data needed to execute a machine instruction is not available to the computer processor when the computer processor is ready to execute that machine instruction, then the execution is stalled. Embodiments disclosed herein provide, to a processing unit, data needed to execute machine instructions typically prior to the processing unit being ready to execute the machine instruction. Embodiments disclosed herein reduce or eliminate the need for big caches to store copies of the data and minimize the round trip latency.

In one embodiment, a computer processor is divided into a master processing unit and one or more consumer processing units. Note that in other embodiment, the master processing unit and the consumer processing unit may be in different processors. In one embodiment, the master processing unit at least partially decodes a machine instruction and determines whether data is needed from memory to execute the machine instruction. If so, the master processing unit may send a read request to memory for the data needed to execute the machine instruction. The read request may indicate that the data is to be sent from the memory to a consumer processing unit. The data sent by the memory in response to the read request may be stored in local read storage that is close to the consumer processing unit for fast access. The master processing unit may also provide at least a portion of the machine instruction to the consumer processing unit. The consumer processing unit may access the data from the local read storage and execute the machine instruction based on the accessed data. Note that there does not need to be multiple copies of the data in caches in order to provide the data to the consumer processing unit by the time that the consumer processing unit is ready to execute the machine instruction.

It is understood that the present technology may be embodied in many different forms and should not be construed as being limited to the embodiments set forth herein. Rather, these embodiments are provided so that this disclosure will be thorough and completely understood. Indeed, the disclosure is intended to cover alternatives, modifications and equivalents of these embodiments, which are included within the scope and spirit of the disclosure as defined by the appended claims. Furthermore, in the following detailed description, numerous specific details are set forth in order to provide a thorough understanding of the technology. However, it will be clear that the technology may be practiced without such specific details.

Figure 1:
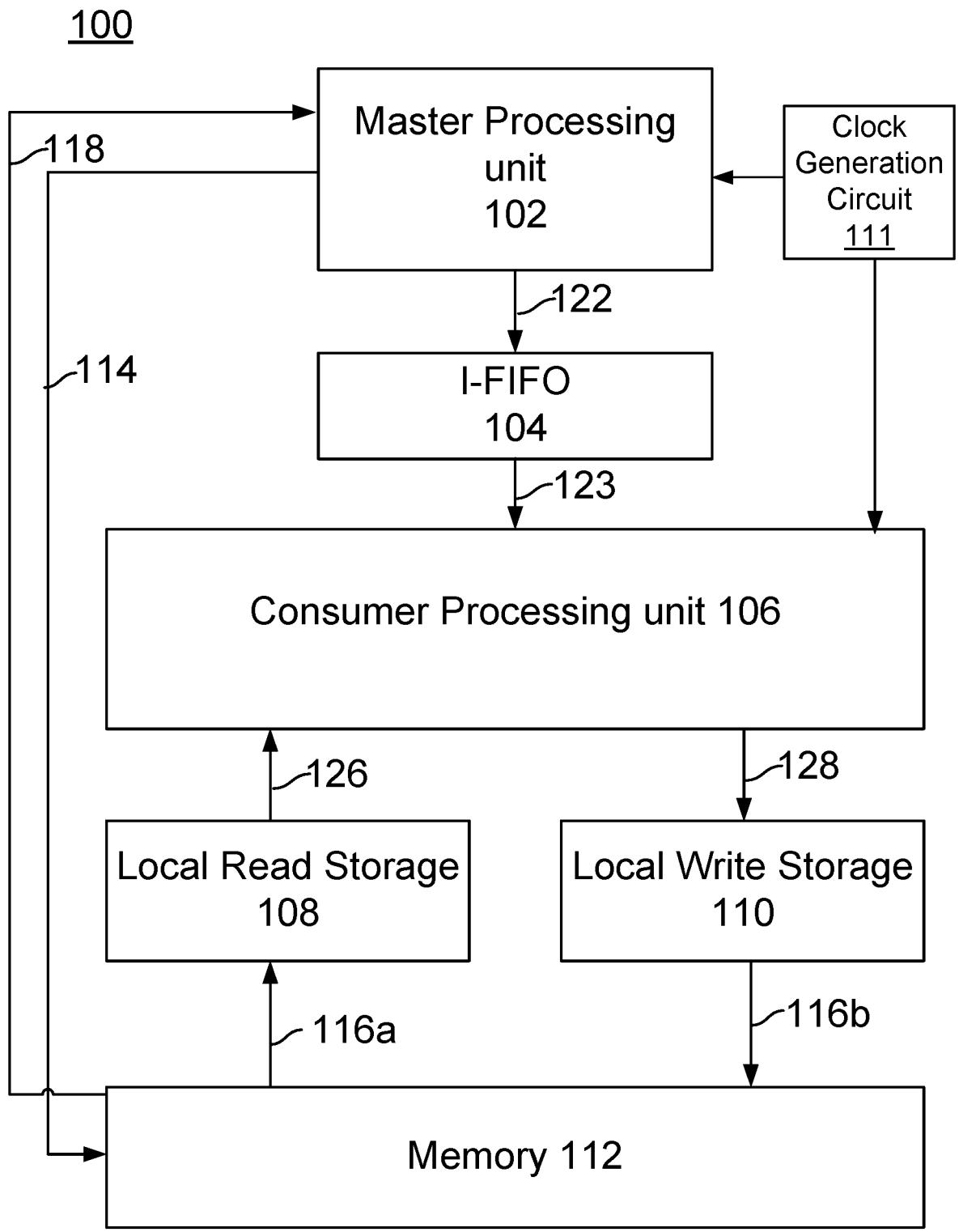
FIG. 1 is a diagram of one embodiment of a computing system.

FIG. 1 is a diagram of one embodiment of a computing system 100. The computing system 100 includes a master processing unit 102, a first-in, first-out instruction queue (I-FIFO) 104, a consumer processing unit 106, local read storage 108, local write storage 110, and memory 112. The memory 112 may include, but is not limited to, static random access memory (SRAM), dynamic random access memory (DRAM), synchronous DRAM (SDRAM), read-only memory (ROM), a combination thereof, or the like. In one embodiment, memory 112 comprises non-transitory storage. Further, memory 112 may comprise any type of memory storage configured to store data, computer programs including machine instructions, and other information. Memory 112 may comprise, for example, one or more of a solid state drive, hard disk drive, magnetic disk drive, optical disk drive, or the like, in various embodiments.

The master processing unit 102 and the consumer processing unit 106 may be associated with an instruction set that comprises machine instructions. A machine instruction may include an operation code that specifies an instruction to perform. A machine instruction may include zero or more operands. For some machine instructions, the operand may refer to a location in memory 112. For other machine instructions, the operand may refer to a register in, for example, the master processing unit 102 or consumer processing unit 106. For other machine instructions, the operand may contain a literal value.

The master processing unit 102 and the consumer processing unit 106 work together to execute machine instructions, in one embodiment. For example, the memory 112 may store a set of machine instructions, which are executed by the combination of the master processing unit 102 and the consumer processing unit 106. The machine instructions could perform a wide variety of tasks including, but not limited to, performing operations in a software application, rendering an image on an electronic display, or processing a digital signal. Together the master processing unit 102 and the consumer processing unit 106 may function as a central processing unit (CPU), a graphics processing unit (GPU), a digital signal processor (DSP), etc. The master processing unit 102 may comprise electronic circuitry (which may include analog and/or digital circuitry) in order to perform various functionality of the master processing unit 102 described herein. The consumer processing unit(s) 106 may comprise electronic circuitry (which may include analog and/or digital circuitry) in order to perform various functionality of the consumer processing unit(s) 106 described herein. The master processing unit 102 may also be referred to herein as master processing logic. The master processing unit 102 may also be referred to herein as a master processor. The consumer processing unit 102 may also be referred to herein as consumer processing logic. The consumer processing unit 102 may also be referred to herein as a consumer processor. The term "processing logic" (or "master processing logic" or "consumer processing logic" or the like) as used herein refers to structural elements including, but not limited to, electronic circuitry (which may include analog and/or digital circuitry). Processing logic may include electronic gates (or logic gates), which may be implemented with, for example, resistor-transitory logic, but is not limited to electronic gates.

Several communication paths 114, 116a, 116b, 118, 122, 123, 126, and 128 are depicted in FIG. 1. A communication path may comprise a number of signal lines. A signal line is capable of transmitting an electronic signal, such as a voltage level, in some embodiments. For example, a signal line may be an electrically conductive path. A signal line is capable of transmitting an electromagnetic signal, such as an optical signal, in some embodiments. For example, a signal line may comprise an optical waveguide. In embodiments, a signal line may include, but is not limited to, one or more of a wire, trace, transmission line, track, pad, layer, lead, metal, portion of a printed circuit board or assembly, conducting material and other material that may transfer or carry an electrical signal, and/or light pulse. In embodiments, a signal line may form one or more geometric shapes, such as a line or multiple connected lines. In embodiments, a signal line may be unidirectional or bidirectional in transferring signals between circuits and within circuits. The various communication paths 114, 116a, 116b, 118, 122, 123, 126, and 128 could be implemented by different signal lines. However, as will be explained below, the same signal lines could be shared by different communication paths.

First communication path 114 allows the master processing unit 102 to send an address to memory 112. The first communication path 114 is an internal bus, in one embodiment. By "internal bus", it is meant that the bus connects two components on the same chip (e.g., on the same integrated circuit). The first communication path 114 has a signal line for each bit to be transferred, in one embodiment. The first communication path 114 may be configured to transfer one word at a time, as one example. The size of the word can vary depending on the architecture. For example, a word might be 16 bits, 32 bits, 64 bits, 128 bits or some other size. The first communication path 114 is used as an address bus, in one embodiment. The first communication path 114 is a uni-directional address bus, in one embodiment.

Second communication path 116 allows data to be transferred between memory 112 and the consumer processing unit 106, in one embodiment. The second communication path 116 is used as a data bus, in one embodiment. The second communication path 116 is depicted as having a path 116a from the memory 112 to the local read storage 108 and a path 116b from the local write storage 110 to the memory 112. Note that the consumer processing unit 106 has access to the local read storage 108 via communication path 126 and the local write storage 110 via communication path 128. In one embodiment, the consumer processing unit 106 comprises local read storage 108 and the local write storage 110 (see, for example, FIG. 3B). In one embodiment, the second communication path 116 is a bi-directional data bus. Thus, the same signal lines may be shared for at least a portion of communication path 116*a* and communication path 116*b*. The second communication path 116 is an internal bus, in one embodiment. The second communication path 116 has a signal line for each bit to be transferred, in one embodiment. The second communication path 116 may be configured to transfer one word at a time, as one example.

The master processing unit 102 accesses at least some of the machine instructions from memory 112, in one embodiment. The third communication path 118 may be used to send machine instructions from the memory 112 to the master processing unit 102. The master processing unit 102 may request such machine instructions by specifying an address of the machine instruction in memory 112 along communication path 114. In one embodiment, memory 112 sends the machine instruction to the master processing unit 102 along third communication path 118. The third communication path 118 is an internal bus, in one embodiment. The third communication path 118 has a signal line for each bit to be transferred, in one embodiment. The third communication path 118 may be configured to transfer one word at a time, as one example. The third communication path 118 is used as a data bus, in one embodiment.

The master processing unit may access data from memory 112, in one embodiment. The third communication path 118 may be used to send data from the memory 112 to the master processing unit 102.

Note that it is possible for the second communication path 116 and third communication path 118 to share the same physical signal lines. The memory 112 specifies a destination address for data it places on signal lines, in one embodiment. For example, the memory 112 may specify an identity of the consumer processing unit 106 in order to send data to local read storage 108, and may specify an identity of the master processing unit 102 in order to send data (e.g., machine instructions) to the master processing unit 102.

Note that it is also possible for the second communication path 116 and third communication path 118 to not share the same physical signal lines. In other words, the second communication path 116 and third communication path 118 may have completely separate physical signal lines.

As previously mentioned, there is a communication path 126 between consumer processing unit 106 and local read storage 108. Local read storage 108 and consumer processing unit 106 are in the same chip, in one embodiment. Local read storage 108 is typically quite close to the consumer processing unit 106 for fast access. For example, the consumer processing unit 106 may be able to access local read storage 108 in a single processor clock cycle. In one embodiment, communication path 126 comprises a number of electrically conductive signal lines.

As previously mentioned, there is a communication path 128 between consumer processing unit 106 and local write storage 110. Local write storage 110 and consumer processing unit 106 are in the same chip, in one embodiment. Local write storage 110 is typically quite close to the consumer processing unit 106 for fast access. In one embodiment, communication path 128 comprises a number of electrically conductive signal lines.

There is also a communication path 122 between the master processing unit 102 and the I-FIFO 104. In one embodiment, the master processing unit 102 and I-FIFO 104 are on the same integrated circuit. In this case, communication path 122 could be an internal bus. However, the master processing unit 102 and I-FIFO 104 could be on different integrated circuits. In one embodiment, the master processing unit 102 and I-FIFO 104 reside in different chips on the same printed circuit board. In this case, at least a portion of communication path 122 may comprise electrically conductive traces on or within the printed circuit board.

The master processing unit 102 is configured to decode machine instructions, in one embodiment. Note that in some cases, the master processing unit 102 partially decodes a machine instruction and the consumer processing unit 106 finishes the decoding of that machine instruction. The machine instructions may be accessed from the memory 112, but could be accessed from some other location. The master processing unit 102 may be configured to execute at least some of the machine instructions. For example, the master processing unit 102 may be configured to execute machine instructions for which operands are not needed from the memory 112. As one example, the master processing unit 102 may be configured to execute machine instructions for which the operand specifies a register in the master processing unit 102. Note that the master processing unit 102 could execute some machine instructions for which operands are needed from memory.

The master processing unit 102 is configured to determine whether a particular machine instruction should be executed by the consumer processing unit 106, in one embodiment. For example, the master processing unit 102 might determine whether an operand for a machine instruction needs to be accessed from the memory 112. The master processing unit 102 might then determine whether it should execute this machine instruction for which the operand is needed, or to instruct the consumer processing unit 106 to execute this machine instruction. As one example, the master processing unit 102 may execute machine instructions for which the operands are scaler values, and instruct the consumer processing units 104 to execute machine instructions for which the operands are vectors.

Thus, there is a set of machine instructions for which data (e.g., operands) are required from memory and that the consumer processing unit 106 should execute, in one embodiment. For such a machine instruction, the master processing unit 102 may send a read request to the memory 112 for the data needed to execute the machine instruction. Note that the read request may be sent directly from the master processing unit 102 to memory 112. By sending the read request "directly" to memory 112 it is meant that no intervening electronic circuit, component, or the like, processes the read request. The master processing unit 102 sends that read request on the first communication path 114 that is between the master processing unit 102 and the memory 112, in one embodiment. Note that in this embodiment, the first communication path 114 provides a direct link from the master processing unit 102 to the memory 112. The read request indicates that the data is to be sent from the memory 112 to the consumer processing unit 106, in one embodiment.

The local read storage 108 is a relatively small storage unit, in one embodiment. The local read storage 108 is configured to hold operands, in one embodiment. As one example, the local read storage 108 may have a depth that can hold a few hundred entries (e.g., a few hundred operands). However, the local read storage 108 could hold more or fewer entries. The width of each entry may be one word, as one example. The local read storage 108 is located physically close to the consumer processing unit 106 for fast access, in one embodiment. For example, the consumer processing unit 106 may be able to access data from local read storage 108 in one or two processor clock cycles. Note, however, that it may take much longer for data to be transferred from memory 112 to the local read storage 108.

For example, it could take tens or even hundreds of processor clock cycles for data to be transferred from memory 112 to local read storage 108. The processor clock cycles being referred to here are with respect to the consumer processing unit 106. Note that the master processing unit 102 may operate at a different frequency than the consumer processing unit 106.

In one embodiment, the local read storage 108 is content addressable memory. In one embodiment, the local read storage 108 is a specialized cache or re-ordering buffer that places the entries in the order in which they will be needed by the consumer processing unit 106.

The master processing unit 102 also adds at least a portion of the machine instruction (for which the read request was sent to memory 112) to the I-FIFO 104, in one embodiment. For example, the master processing unit 102 could add an opcode and a decoded address to the I-FIFO 104. Note that some machine instructions added to the I-FIFO may be fully decoded and others partially decoded. Thus, adding a fully decoded or partially decoded machine instruction are examples of adding a portion of a machine instruction to the I-FIFO 104. Adding an opcode and a decoded address to the I-FIFO 104 is one example of adding a portion of a machine instruction to the I-FIFO 104. The I-FIFO 104 is able to hold partially decoded machine instructions, and/or fully decoded instructions, in one embodiment. For example, the I-FIFO 104 is able to hold an opcode and a decoded address for a machine instruction. The consumer processing unit 106 is configured to access machine instructions from the I-FIFO 104, in one embodiment. Note that "accessing a machine instruction" from the I-FIFO 104 will be understood to mean to access whatever portion of the machine instruction was placed on the I-FIFO in the event that the entire machine instruction was not placed on the I-FIFO. In one embodiment, there is a communication path 123 between the I-FIFO 104 and consumer processing unit 106 to allow logic within the consumer processing unit 106 to access the instructions from I-FIFO 104. Note that the I-FIFO 104 may be considered to be part of the consumer processing unit 106. The machine instructions may be fully decoded, and/or partially decoded, in one embodiment. For example, the consumer processing unit 106 may be configured to access an opcode and a decoded address. The consumer processing unit 106 is configured to access data from the local read storage 108 in order to execute the machine instructions, in one embodiment.

The I-FIFO 104 has a depth that provides a sufficient delay such that the data for a particular machine instruction is in the local read storage 108 by the time the consumer processing unit 106 accesses the particular machine instruction from the I-FIFO 104, in one embodiment. For example, there may be a "read delay" of tens or even hundreds of processor clock cycles between the time the read request is sent and the time the data is provided to the local read storage 108. The master processing unit 102 may add a sufficient number of machine instructions to the I-FIFO 104 to account for this read delay.

Thus, the master processing unit 102 and the consumer processing unit 106 may work together to implement at least some of the machine instructions. For example, the master processing unit 102 might decode a machine instruction that needs an operand from memory 112 and the consumer processing unit 106 might execute that machine instruction using data from the local storage 108.

The local write storage 110 is used to store data from consumer processing unit 106 that is to be written to memory 112, in one embodiment. For example, the consumer processing unit 106 may store results from execution of a machine instruction in the local write storage 110. In one embodiment, local write storage 110 stores an address of the data (e.g., address in memory) along with the data. In one embodiment, the local write storage stores a transaction identifier with each data entry. The local write storage 110 may be on the same chip (e.g., same integrated circuit) as the consumer processing unit 106. Also, local write storage 110 may be physically close to the consumer processing unit 106 for fast access. For example, local write storage 110 may be close enough such that the consumer processing unit 106 may be able to store data in the local write storage 110 in as little as one or two processor clock cycles.

In one embodiment, the master processing unit 102, I-FIFO 104, consumer processing unit 106, local read storage 108, local write storage 110, and memory 112 are all located on the same integrated circuit. However, it is not required that all of those components be located on the same integrated circuit.

In one embodiment, the I-FIFO 104, consumer processing unit 106, local read storage 108, and local write storage 110 are all on the same integrated circuit, but the master processing unit 102 is located on a different integrated circuit than the I-FIFO 104, consumer processing unit 106, local read storage 108, and local write storage 110. In such a scenario, the memory 112 may be on the same integrated circuit as the I-FIFO 104, consumer processing unit 106, local read storage 108, and local write storage 110. However, it is not required that the memory 112 be on the same integrated circuit as the I-FIFO 104, consumer processing unit 106, local read storage 108, and local write storage 110.

In one embodiment, the I-FIFO 104, consumer processing unit 106, local read storage 108, and local write storage 110 are all on the same integrated circuit, but the memory 112 is located on a different integrated circuit than the I-FIFO 104, consumer processing unit 106, local read storage 108, and local write storage 110. In such a scenario, the master processing unit 102 could be on the same integrated circuit as the I-FIFO 104, consumer processing unit 106, local read storage 108, and local write storage 110. However, it is not required that the master processing unit 102 be on the same integrated circuit as the I-FIFO 104, consumer processing unit 106, local read storage 108, and local write storage 110 in this scenario.

The system 100 may be considered to be a computer processor (made up of master processing unit 102 and consumer processing unit 106) having a triangular load protocol. The triangle being referred to has "vertices" of the master processing unit 102, the memory 112, and the consumer processing unit 106. Note that such a triangular load protocol is quite different from the master processing unit 102 making a data request to memory 112 and the memory 112 simply returning the data to the master processing unit 102. Conceptually, communication paths 114, 116, and 122 may be considered to be "sides" of the triangle.

As briefly noted above, the master processing unit 102 and the consumer processing unit 106 are not required to operate at the same clock frequency (although operating at the same clock frequency is one possibility). Clock generation circuit 111 generates a clock signal for the master processing unit 102 and for the consumer processing unit 106, respectively. The clock generation circuit 111 may comprise an oscillating circuit that generates a base clock signal. The clock generation circuit 111 may further comprise a circuit that increases and/or decreases the frequency of the base clock signal. The clock signal generation circuit 111 may also have an input for selecting a clock frequency for the master processing unit 102 and for the consumer processing unit 106. In one embodiment, the master processing unit 102 is provided a clock signal having a first frequency and the consumer processing unit 106 is provided a clock signal having a second frequency other than the first frequency. In one embodiment, the master processing unit 102 operates at a fast clock frequency than the consumer processing unit 106. In one embodiment, the master processing unit 102 operates at a slower clock frequency than the consumer processing unit 106. In one embodiment, the clock generation circuit 111 is on the same chip as the master processing unit 102 and the consumer processing unit 106. Note that different clock generation circuits 111 could be used to supply the different clock signals. For example, if the master processing unit 102 and consumer processing unit 106 are on different chips, each chip might have its own clock generation circuit 111.

Figure 2:
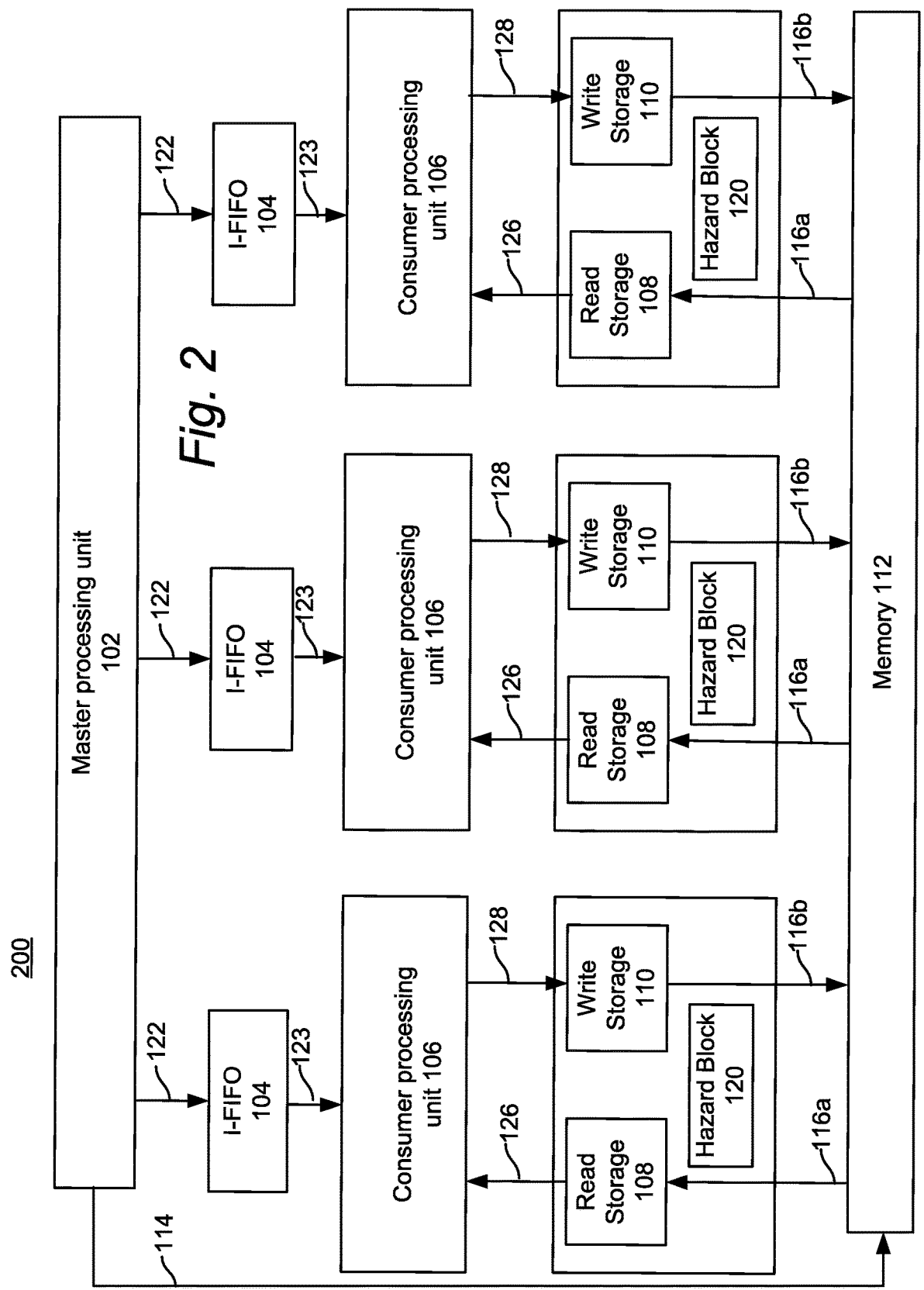
FIG. 2 is a diagram of one embodiment of a computing system having a master processing unit and several consumer processing units.

FIG. 2 is a diagram of one embodiment of a computing system 200 having a master processing unit 102 and several consumer processing units 106. Each consumer processing unit 106 has an I-FIFO 104, local read storage 108, local write storage 110, and a hazard block 120. This system 200 is similar to the system 100, but adds additional consumer processing units 106. Also, each consumer processing unit 106 in system 200 has a hazard block 120. The hazard block 120 may be used to take care of read and write hazards within a consumer processing unit 106. The hazard block may also make sure all write data has been transferred from the write storage 110 back to memory 112. In one embodiment, the write data is kept in write storage 110 until an acknowledgement is received from memory 112 that the write data has been received by memory 112. In one embodiment, the master processing unit 102 issues a command to the hazard block 120 with respect to writes that the master processing unit 102 has committed. In response to such a command, the hazard block 120 communicates with the master processing unit 102 when the hazard block 120 has received responses for all of the writes, in one embodiment.

Each consumer processing unit 106 has a unique identifier, in one embodiment. The master processing unit 102 may also have a unique identifier. In one embodiment, these identities are referred to as processor identifiers (e.g., if the processing units are referred to as processors). In one embodiment, the identifiers are used as destination addresses for data from the memory 102. When the master processing unit 102 requests data from memory 112, the master processing unit 102 adds one or more destination addresses to the read request, in one embodiment. This allows the data from memory 112 to be routed to the correct processor.

In one embodiment, the master processing unit 102 can specify one or more of the consumer processing units 106 as the data destination. Thus, the system 200 can have a unicast mode (data sent to one consumer processing unit 106), a multi-cast mode (data sent to multiple consumer processing units 106), and a broadcast mode (data sent to all connected consumer processing units 106 (and optionally the master processing unit 102)). In one embodiment, the master processing unit 102 specifies its own unique identifier to request that the memory 112 send the data back to the master processing unit 102.

In one embodiment, the master processing unit 102 and the consumer processing units 106 examine a destination address in a read response packet from the memory 112 to determine whether data in the read response packet is intended for that processing unit.

The master processing unit 102 and consumer processing units 106 may operate at the same or different frequencies. The consumer processing units 106 may be operated at the same frequencies as each other, but that is not required. In one embodiment, the system 200 in FIG. 2 has a clock generation circuit 111 similar to the one in the system 100 in FIG. 1 in order to provide clock signals of suitable frequencies to the various processing units 102, 106.

Figure 3A:
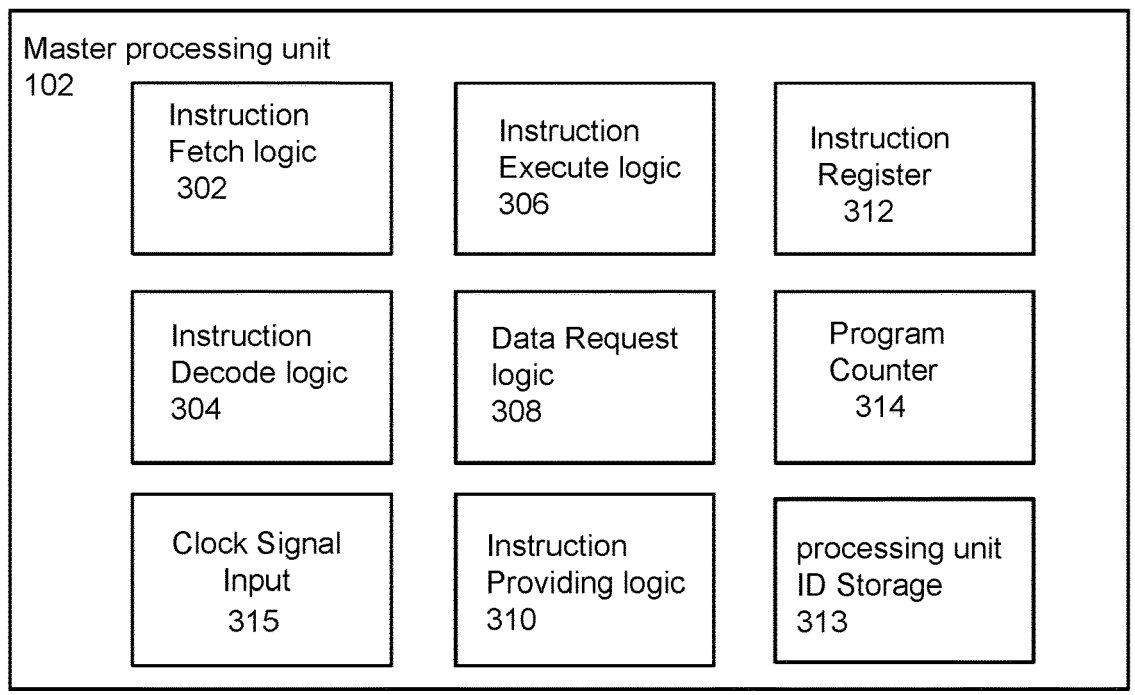
FIG. 3A is a diagram that depicts further details of one embodiment of a master processing unit.

FIG. 3A is a diagram that depicts further details of one embodiment of a master processing unit 102. The master processing unit 102 has instruction fetch logic 302, instruction decode logic 304, instruction execute logic 306, data request logic 308, instruction providing logic 310, an instruction register 312, processor identifier (ID) storage 313, a program counter 314, clock signal input 315. In some embodiments, the master processing unit 102 does not contain all of these components. In other embodiments, the master processing unit 102 has additional components. For example, the master processing unit 102 could include a cache for holding machine instructions that were recently accessed from memory 112.

The instruction fetch logic 302 is configured to fetch machine instructions (also referred to as program instructions). A machine instruction could be fetched from the memory 112, or some other location. The instruction decode logic 304 is configured to decode the machine instructions. In some cases, decode logic 304 partially decodes a machine instruction. In this case, the consumer processing unit 106 may complete the decoding of the machine instruction. To at least partially decode machine instructions instruction decode logic 304 understands an instruction set that is executed at least in part by the master processing unit 102. Herein "partially decoding a machine instruction" means that at least some of the bits in the machine instruction are decoded, but not all of the bits are decoded. Herein "at least partially decoding a machine instruction" means that at least some of the bits in the machine instruction are decoded, and possibly all of the bits are decoded. The instruction decode logic 304 performs enough decoding to determine whether the instruction should be executed by the master processing unit 102 or a consumer processing unit, in one embodiment. The instruction decode logic 304 performs enough decoding to at least perform address decoding, in one embodiment. Thus, the instruction decode logic 304 may generate a memory address of data needed to execute the machine instruction.

The instruction register 312 may hold the instruction that is currently being decoded. The program counter 314 is a register that may contain the address of the machine instruction that is in the instruction register 312. Note that the master processing unit 102 may have logic to advance the program counter 314. Such logic may handle branches in program execution, for example.

The instruction execute logic 306 is configured to execute at least some of the machine instructions. The instruction execute logic 306 could include an arithmetic logic unit (ALU), but an ALU is not required. An ALU may be used by the master processing unit 102 to, for example, compute control variable such as counters and addresses.

Figure 7A:
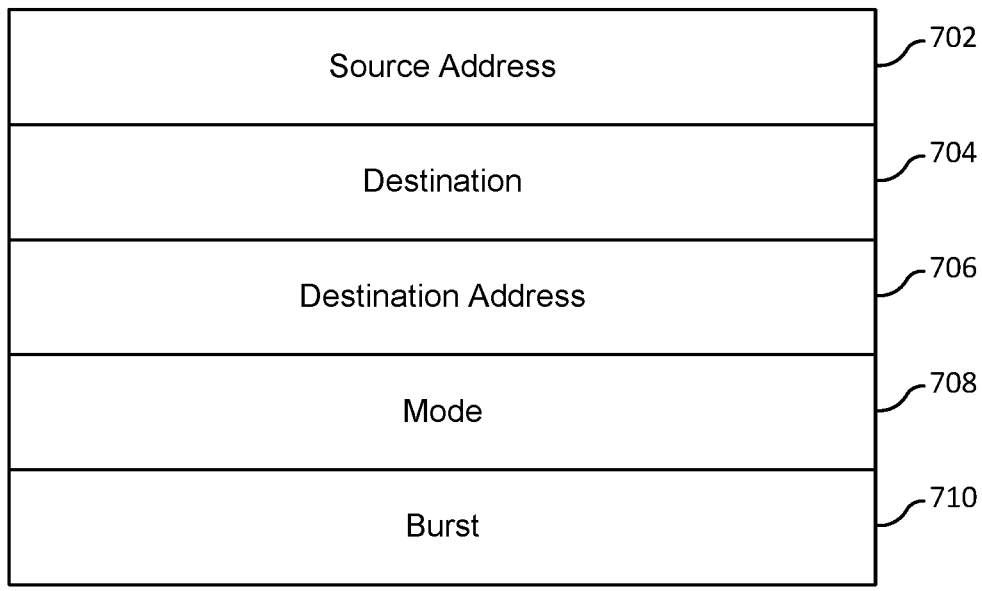
FIG. 7A is an example read request packet that may be sent from the master processing unit to memory to request data.

The data request logic 308 is configured to request data (e.g., operands) needed to execute machine instructions from the memory 112. In one embodiment, the data request logic 308 is configured to prepare a read request packet. FIG. 7A depicts one example of a read request packet 700 that may be prepared by data request logic 308 and sent to memory 112.

The instruction providing logic 310 is configured to provide machine instruction to a consumer processing unit 106, in one embodiment. Note that it is not required that the entire machine instruction be provided to the consumer processing unit 106, but providing the entire machine instruction is a possibility. In one embodiment, instruction providing logic 310 adds fully decoded, at least partially decoded, and/or un-decoded machine instructions to an I-FIFO 104 of at least one of the consumer processing units 106.

Processing unit ID storage 313 may be any storage that is used to store an identifier of the master processing unit 102. Processing unit ID storage 313 may be volatile or non-volatile. Processing unit ID storage 313 may be read only or writable. In one embodiment, when the system that contains the master processing unit 102 is powered on, the processing unit ID storage 313 is written to with an ID of the master processing unit 102. The processing unit ID in the processing unit ID storage 313 may be used to differentiate between the master processing unit 102 and other processing units 106 when, for example, memory 112 sends read response packets having processing unit ID's contained therein (as destination addresses).

Note that in one embodiment, the IDs of consumer processing units 106 may also be stored in processing unit ID storage 313. The master processing unit 102 may use those processing unit IDs when, for example, forming read request packets to send to memory 112.

Clock signal input 315 is configured to receive a clock signal that may be used for controlling operation within the master processing unit 102. For example, the master processing unit may use the clock signal to control the execution of an instruction pipeline. For example, the clock signal may be used to control timing of instruction fetch logic 302, instruction decode logic 304, instruction execute logic 306, data request logic 308, and/or instruction providing logic 310.

Many of the elements depicted in FIG. 3A may be implemented within a control unit of the master processing unit 102. For example, instruction fetch logic 302, instruction decode logic 304, data request logic 308, instruction providing logic 310, an instruction register 312 and a program counter 314 are within a control unit, in one embodiment. As is well understood, a control unit of a processor may direct operation of a processor by providing timing and control signals. In one embodiment, the various logic depicted in FIG. 3A are implemented with electronic circuitry, which may include analogy and/or digital circuitry.

Figure 3B:
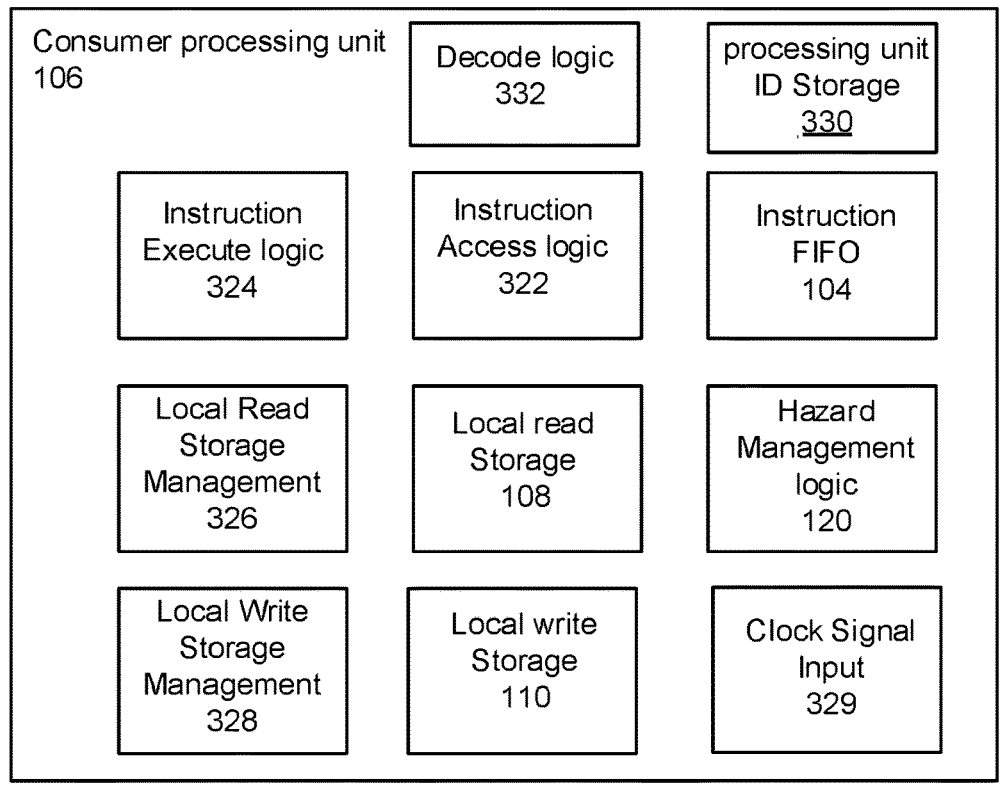
FIG. 3B is a diagram that depicts further details of one embodiment of a consumer processing unit.

FIG. 3B is a diagram that depicts further details of one embodiment of a consumer processing unit 106. The consumer processing unit 106 includes Instruction FIFO 104, local read storage 108, local write storage 110, hazard management logic 120, instruction access logic 322, instruction execute logic 324, local read storage management 326, local write storage management 328, clock signal input 329, processing unit ID storage 330, and decode logic 332. Aspects of embodiments of I-FIFO 104, local read storage 108, local write storage 110, and hazard management logic 120 have already been discussed with respect to FIGS. 1 and 2. In one embodiment, the various logic and management depicted in FIG. 3B are implemented with electronic circuitry, which may include analogy and/or digital circuitry.

The instruction access logic 322 is configured to access the next machine instruction to execute from the I-FIFO 104. In one embodiment, the instruction access logic 322 is configured to execute the machine instructions in a serial fashion. For example, the instruction access logic 322 may execute the machine instructions in accordance with the order in the I-FIFO 104.

In some cases, the instructions on the I-FIFO are only partially decoded. In this case, the decode logic 332 finishes the decoding. For example, the decode logic 332 could decode an opcode in a machine instruction. In some cases, the instructions on the I-FIFO are fully decoded, such that further decoding by the consumer processing unit 106 is not necessary. It is also possible for an instruction on the I-FIFO to be completely undecoded (even if the master partially decoded the instruction). Thus, the decode logic 332 could fully decode an instruction, in some cases.

Note that a partially decoded instruction might comprise just a portion of the instruction. For example, a partially decoded instruction might include a decoded address and an opcode. The opcode could be decoded by the decode logic 332.

The instruction execute logic 324 is configured to execute the machine instructions. The instruction execute logic 324 may include an arithmetic logic unit (ALU). Note that some machine instructions may not need an ALU for execution. The instruction execute logic 324 may also be configured to access the data (e.g., operands) needed to execute the machine instructions from local read storage 108.

Figure 7B:
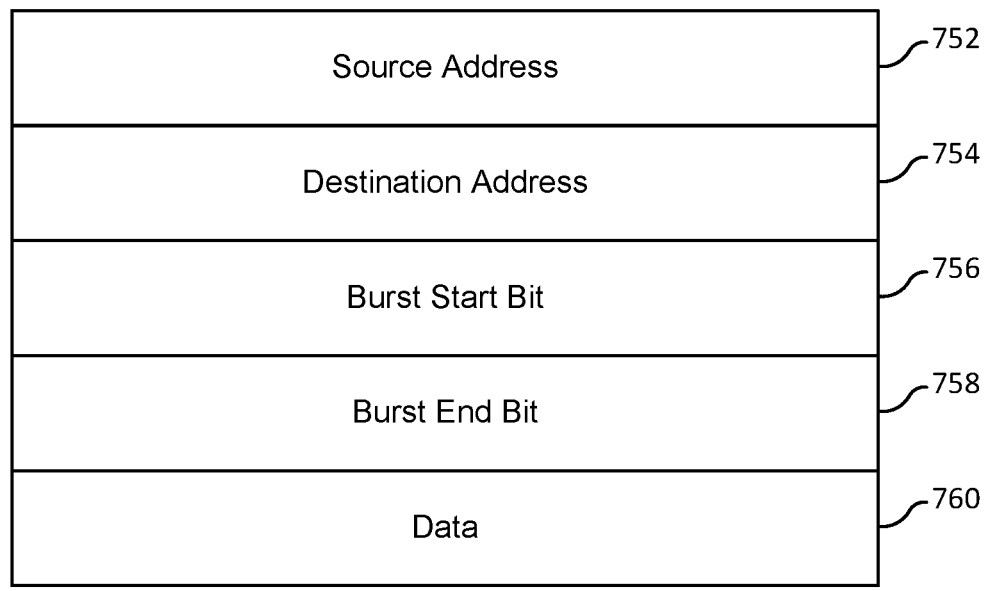
FIG. 7B is an example read response packet, which may be sent by memory.

The local read storage management 326 is configured to manage local read storage 108. In one embodiment, the local read storage management 326 is configured to add data from the memory 112 to the local read storage 108. For example, local read storage management 326 may be configured to read a destination address in a read response packet from memory 112, and add the data in the read response packet to the local read storage 108 responsive to a determination that the data is intended for the consumer processing unit 106. FIG. 7B depicts one example of a read response packet 750 that the local read storage management 326 may process. In one embodiment, the local read storage management 326 is configured to remove data from the local read storage 108 after the data has been used to execute a machine instruction.

In one embodiment, the local read storage 108 comprises content addressable memory (CAM). For example, each entry in the CAM might specify an address from memory 112 and the data that was read from memory 112 for that memory location. The local read storage management 326 may be configured to add entries to the CAM, wherein each entry has data from the memory 112 and the address in memory 112 of that data.

In one embodiment, the local read storage 108 comprises a re-order buffer. Note that the memory 112 will not necessarily provide data to the consumer processing unit 106 in the same order in which it was requested by the master processing unit 102. The local read storage management 326 may be configured to re-order the data from the memory 112 such that the data is in the same order as the corresponding machine instructions are on the I-FIFO 104.

Figure 6:
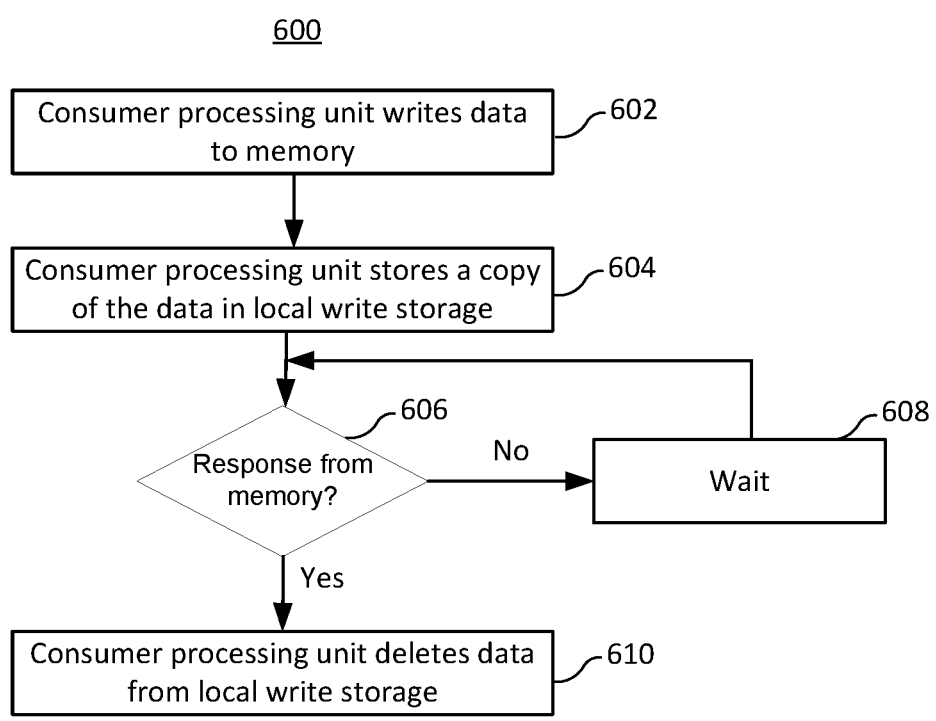
FIG. 6 is a flowchart of one embodiment of a process of a consumer processing unit managing local write storage.

The local write storage management 328 is configured to manage local write storage 110. In one embodiment, local write storage management 328 is configured to remove data from the local write storage 110 responsive to a determination that the data has been written to memory 112. FIG. 6 provides further details of one embodiment of a process of managing the local write storage 110.

Figure 10:
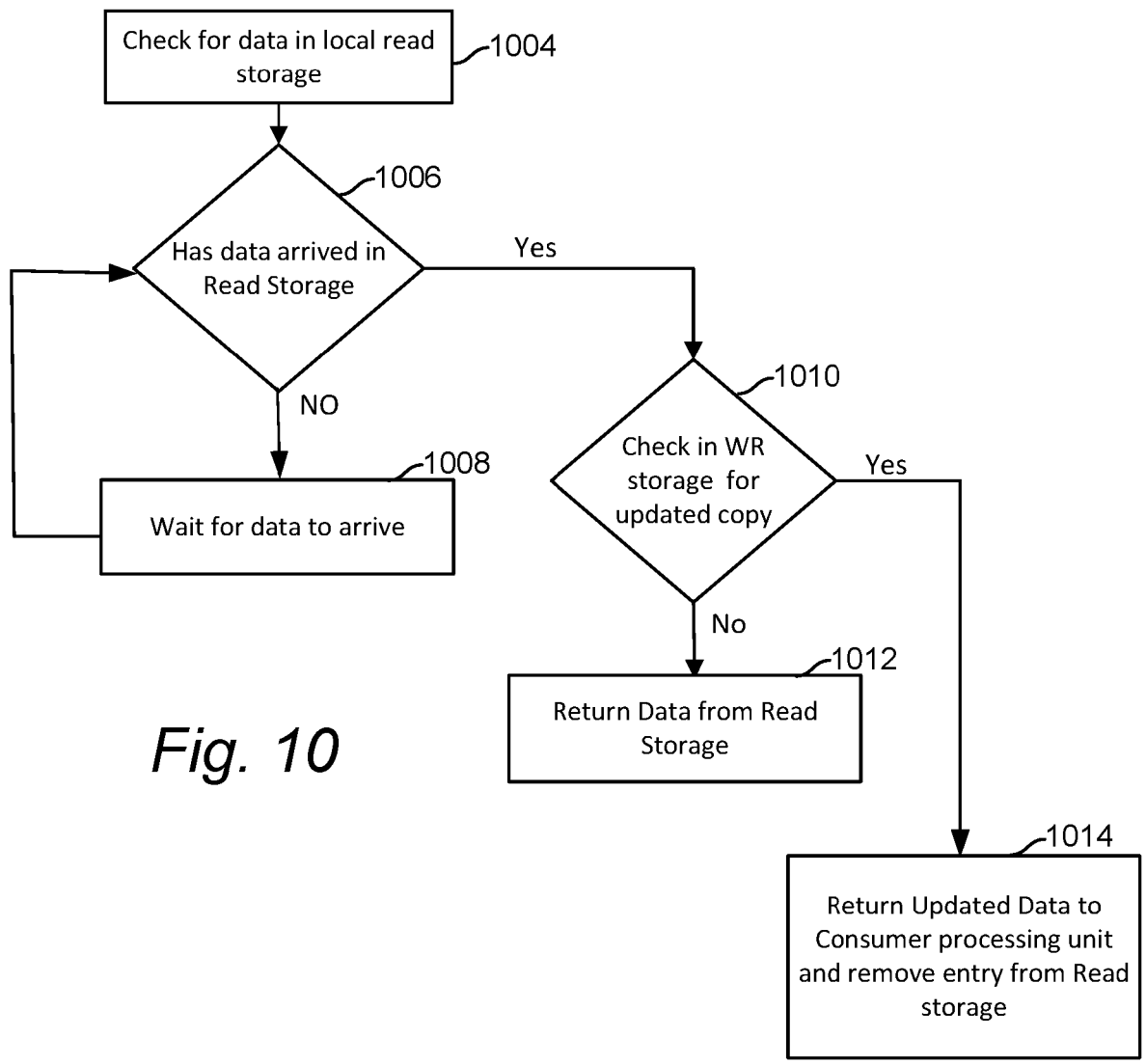
FIG. 10 is a flowchart of one embodiment of a process of hazard block operation.

The hazard management logic 120 manages read and write hazards. This hazards may include read after write (RAW), write after read (WAR), write after write (WAW) hazards, etc. In one embodiment, the hazard management logic 120 provides a synchronization function. Further details of operation of embodiment of hazard management logic 120 are depicted in FIG. 10.

Processing unit ID storage 330 may be any storage that is used to store an identifier of the consumer processing unit 102. Processing unit ID storage 330 may be volatile or non-volatile. Processing unit ID storage 330 may be read only or writable. In one embodiment, when the system that contains the consumer processing unit 106 is powered on, the processing unit ID storage 330 is written to with an ID of the 330 processing unit 102. The processing unit ID in the processing unit ID storage 330 may be used to differentiate between this consumer processing unit 106, and the master processing unit 102 and other consumer processing units 106 when, for example, memory 112 sends read response packets having processing unit ID's contained therein (as destination addresses for data from memory 102).

Clock signal input 329 is configured to receive a clock signal that may be used for controlling operation within the consumer processing unit 106. For example, the consumer processing unit may use the clock signal to control the timing of instruction execute logic 324.

Figure 4:
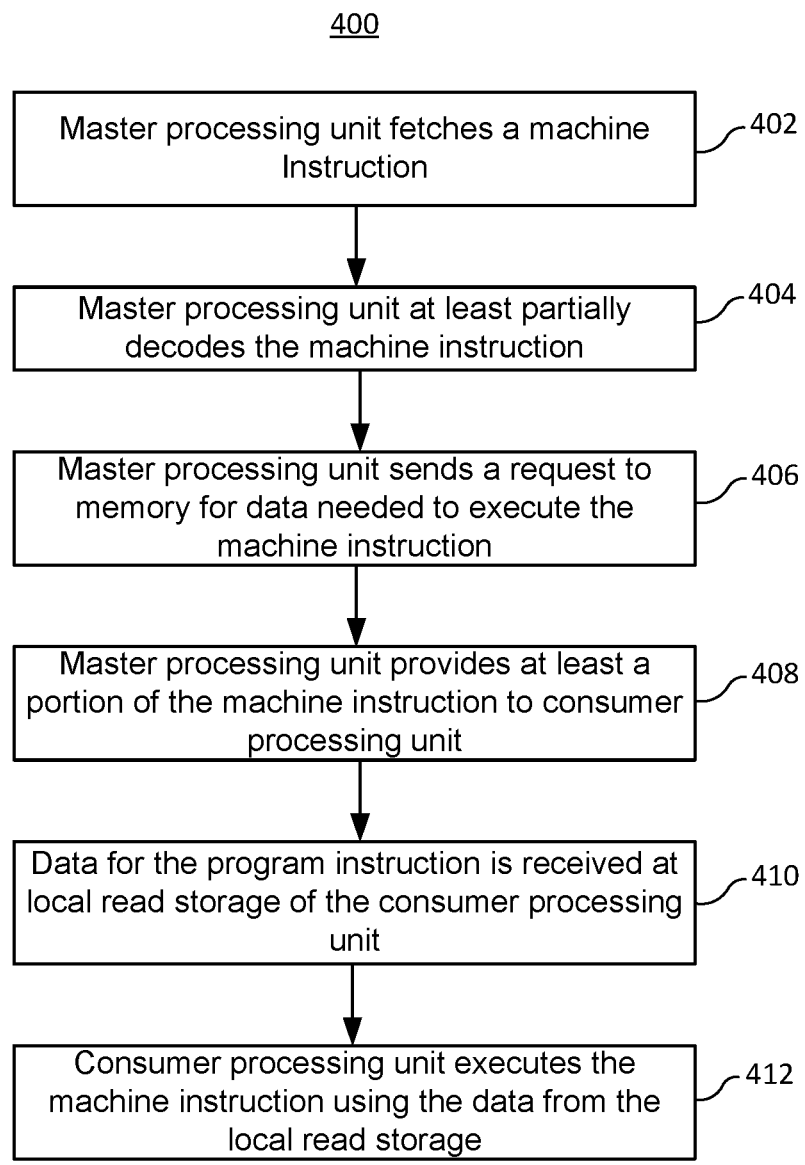
FIG. 4 is a flowchart of one embodiment of a process of executing program instructions.

FIG. 4 is a flowchart of one embodiment of a process 400 of executing machine instructions. A machine instruction may also be referred to herein as a program instruction. The process 400 may be performed within system 100, 200, but is not limited thereto. Process 400 may also be performed within system 900 in FIG. 9, to be discussed below. In step 402, a master processing unit 102 fetches a machine instruction. In one embodiment, the master processing unit 102 fetches the machine instruction along a data path between the master processing unit and memory 112. In one embodiment, the machine instruction is sent from memory to master processing unit 102 on third communication path 118 (see FIG. 1). Note that the master processing unit 102 could obtain the machine instruction from a location other than the memory 112. The machine instruction may be stored into instruction register 312. In one embodiment, instruction fetch logic 302 performs step 402.

In step 404, the master processing unit 102 at least partially decodes the machine instruction. For example, instruction decode logic 304 at least partially decodes the machine instruction based on the instruction set for the master processing unit 102. The master processing unit 102 performs enough decoding to at least decode an address of data needed to execute the instruction, in one embodiment. In some cases, the master processing unit 102 fully decodes the instruction. Note that when fully decoding the instruction, the master might examine all of the fields of the machine instruction. For example, the master processing unit 102 may examine the field for the opcode to determine what operation the machine instruction is to perform, even though the master does not execute the operation.

In step 406, the master processing unit 102 sends a read request to the memory 112 for data (e.g., one or more operands) needed to execute the machine instruction. In one embodiment, the request is sent on first communication path 114 (see FIG. 1). In one embodiment, the master processing unit 102 sends the read request directly to the memory 112 on the first communication path 114. In one embodiment, data request logic 308 performs step 402.

In step 408, the master processing unit 102 provides the at least a portion of the machine instruction to a consumer processing unit 106. In one embodiment, the master processing unit 102 adds at least a portion of the machine instruction to an I-FIFO 104 associated with the consumer processing unit 106. In one embodiment, instruction providing logic 310 performs step 402. In one embodiment, the master processing unit 102 adds at least a decoded address and at least an opcode to the I-FIFO 104.

In step 410, data for the machine instruction is received at the local read storage of the consumer processing unit 106. The data is received along a communication path 116 between the memory 112 and local storage 108, in one embodiment. In one embodiment, local read storage management 326 adds the data from the memory 112 to local read storage 108.

In step 412, the consumer processing unit 106 executes the machine instruction using the data from local storage 108. Note that if the machine instruction was not fully decoded by the master processing unit 102, then the consumer processing unit 106 may finish decoding the instruction. In one embodiment, instruction execute logic 324 performs at least a portion of step 412. Note that the master processing unit 102 and the consumer processing unit 106 may operate at different clock frequencies in process 400.

Figure 5A:
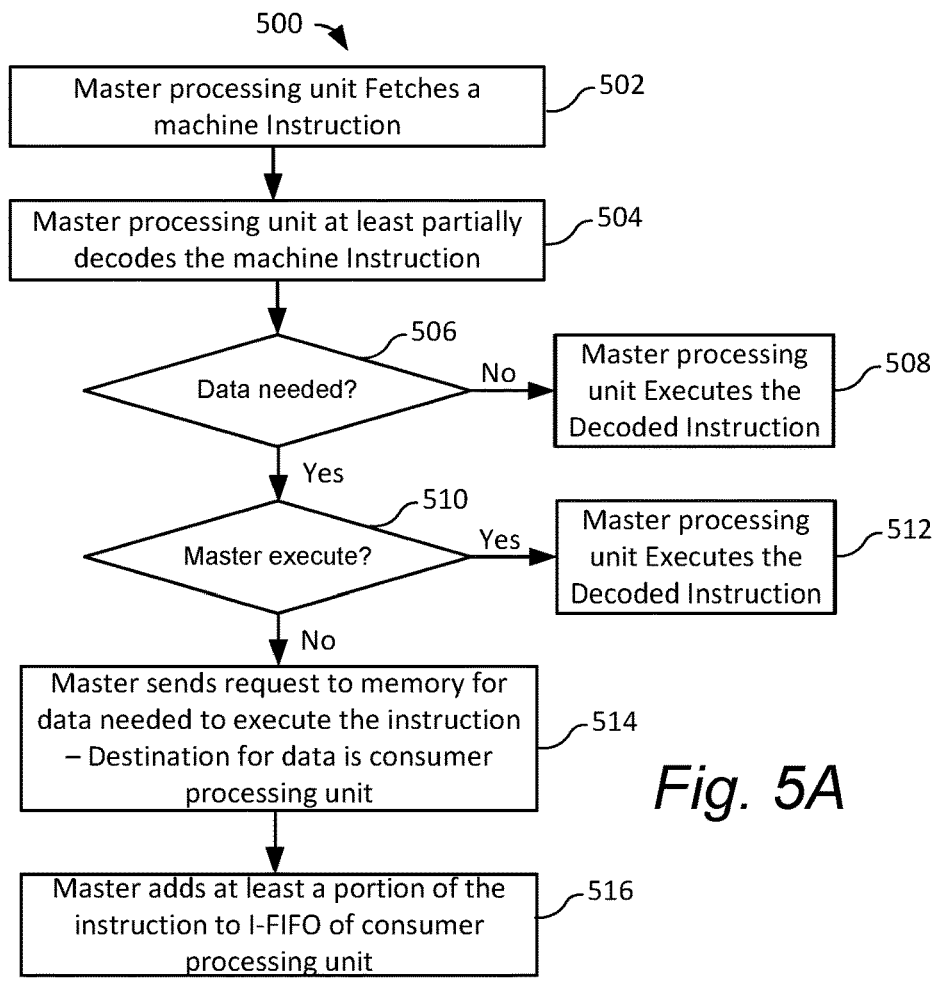
FIG. 5A is a flowchart of one embodiment of a process of a master processing unit processing a machine instruction.

FIG. 5A is a flowchart of one embodiment of a process 500 of a master processing unit 102 processing a machine instruction. The master processing unit 102 may repeat the process 500 for each instruction in a set of machine instructions.

Step 502 includes the master processing unit 102 fetching a machine instruction. Step 502 may be similar to step 402. Step 504 includes the master processing unit at least partially decoding the machine instruction. Step 504 may be similar to step 404.

Step 506 includes the master processing unit 102 determining whether data is needed from memory 112 in order to execute the machine instruction. As one example, the master processing unit determines whether the machine instruction has an operand that references memory 112. If the machine instruction does not need data from memory to be executed, then the master processing unit 508 executes the machine instruction in step 508.

In the event that the machine instruction does need data from memory in order to execute, then the process continues at step 510. In step 510, the master processing unit 102 determines whether it should execute this machine instruction. For example, the master processing unit 104 might determine that it should execute an instruction that is not very compute intensive, even though the instruction needs to access memory. As one example, the master processing unit 104 might execute instruction for which the data is scalar, with the consumer processors executing instructions having vector data. In step 512, the master processing unit 102 executes this machine instruction. Thus, note that even though the machine instruction needs data to execute, the master processing unit 102 could in some cases execute the machine instruction.

If the master determines that it is not to execute this machine instruction (Step 510=no), then the process continues at step 514. In step 514, the master processing unit 102 sends a read request to memory 112 for the data needed to execute the machine instruction. The master processing unit 102 specifies a destination identifier in the read request. The destination identifier is a unique identifier of one of the consumer processing units 106, in one embodiment. Step 514 is one embodiment of step 406.

In step 516, the master processing unit 102 adds at least a portion of the instruction to the I-FIFO for the consumer processing unit 106. Step 516 is one embodiment of step 408.

Figure 5B:
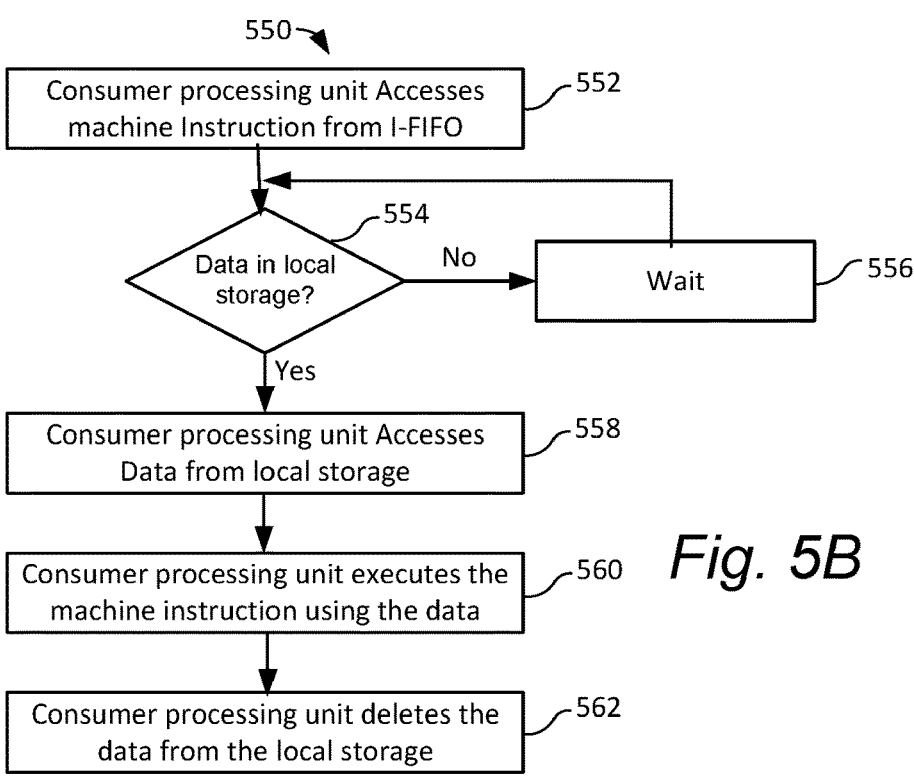
FIG. 5B is a flowchart of one embodiment of a process of a consumer processing unit processing a machine instruction.

FIG. 5B is a flowchart of one embodiment of a process 550 of a consumer processing unit 106 processing a machine instruction. This process 550 may be used in combination with process 500 to process a machine instruction that was placed by the master processing unit 102 onto the I-FIFO in step 516. In step 552, the consumer processing unit 106 accesses the machine instruction from the I-FIFO 104. Note that the I-FIFO 104 might only contain a portion of the machine instruction such as a decoded address and an opcode.

In step 554, the consumer processing unit 106 determines whether data needed to execute the machine instruction presently resides in local read storage 108. The consumer processing unit 106 may make this determination based on the decoded address. In one embodiment, the local read storage 108 is a content addressable memory (CAM). In this case, the consumer processing unit 106 searches the CAM for the data for the machine instruction. For example, each entry in the CAM might specify an address from memory 112 and the data that was provided from memory 112 for that memory location. The consumer processing unit 106 may access the memory location from an operand portion of a decoded machine instruction and request that the CAM provide data for that memory location.

In one embodiment, the local read storage 108 comprises a re-order buffer. Note that the memory 112 will not necessarily provide the requested data to the consumer processing unit in the same order in which the master processing unit 102 requested the data. Thus, in one embodiment, the consumer processing unit re-orders the data from memory 112 such that the data in the local read storage 108 is in the same order as the machine instructions in the I-FIFO 104. In this case, the consumer processing unit 106 may simply access the data in the local read storage 108 sequentially. If data for one of the machine instructions has not yet been provided by memory 112, the entry may be marked in some manner to indicate that the data at that entry is not valid. For example, a flag in an entry could indicate whether that entry contains valid data.

If the data is not presently in local read storage 108, then the consumer processing unit 106 waits (step 556). Note that this differs from some conventional techniques in which a processor might treat such an occasion as a cache miss and attempt to obtain the data from memory at a higher level of the memory hierarchy. However, also note that the system may be set up to avoid or at least minimize such occasions when the data is not available when the consumer processing unit 106 is ready to execute the machine instruction.

In step 558, the consumer processing unit 106 accesses the data from the local read storage 108. Note that the consumer processing unit 106 may be able to access the data from the local read storage 108 in as little as one processor clock cycle.

In step 560, the consumer processing unit 106 executes the machine instruction using the data. Step 560 is one embodiment of step 412. Note that FIG. 6 discusses one embodiment of the consumer processing unit 106 writing results of the execution to memory 112, in the event that there are such results.

In step 560, the consumer processing unit 562 deletes the data associated with the machine instruction from the local read storage 108. This enables the size of the local read storage 108 to be kept small.

FIG. 6 is a flowchart of one embodiment of a process 600 of a consumer processing unit 106 managing local write storage 110. This process 600 may be performed in combination with process 550 in the event that there are results to store to memory 112. In step 602, the consumer processing unit 106 writes results of the execution of the machine instruction to the memory 112. The results are sent on communication path 116b, in one embodiment.

Step 604 includes the consumer processing unit 106 storing a copy of the data that was just written to the memory 112 in local write storage 110.

Step 606 includes the consumer processing unit 106 determining whether it has received a response from memory 112 indicating that the memory has been written to memory 112. The consumer processing unit 106 waits (step 608) until it receives such a response.

Step 610 is performed after the consumer processing unit 106 receives the response from memory 112. Step 610 includes the consumer processing unit 106 deleting the data from the local write storage 110, responsive to receiving the response from memory 112.

FIG. 7A is an example read request packet 700 that may be sent from the master processing unit 102 to memory 112 to request data from memory 112. The read request packet 700 allows the master processing unit 102 to specify the destination to which the memory 112 is to send the data. The destination may be the master processing unit 102, or one or more of the consumer processing units 106, in one embodiment.

Source address field 702 is for a memory address from which the data is to be accessed. In one embodiment, the master processing unit 102 includes this address based on the location of one or more operands for a machine instruction.

Destination field 704 may be used to specify the type of destination for the data. For example, the destination field 704 could specify whether the destination is a consumer processing unit 106, the master processing unit 102, or some other memory location. The other memory location could be a different location in memory 112, for example.

Destination address field 706 is for an address of the destination. For example, destination address field 706 could hold the unique processor identifier of a consumer processing unit 106, the unique processor identifier of the master processing unit 102, a memory address in memory 112, etc.

Mode field 708 may be used to specify how many actual destinations there are. The mode could include a unicast mode (one destination), multicast mode (multiple destinations) and broadcast mode (all processors connected to memory are to receive data). In one embodiment, the various destinations for multicast mode are sent to the memory 112 in advance. Thus, the memory 112 can store a configuration table that indicates which processors (e.g., consumer processing units 106 and possibly master processing unit 102) should receive data when in multicast mode. Alternatively, the destinations could be sent by expanding the destination address field 706.

The burst field 710 is used to indicate the burst mode. This might be used to indicate how many words of data for the memory 112 to send. Thus, the memory 112 might send operands for more than one machine instruction, based on a single read request packet, as one example.

FIG. 7B is an example read response packet 750, which may be sent by memory 112 in response to the example read request packet 700. The memory could send the read response packet 750 to a consumer processing unit 106 or the master processing unit 104, for example. In one embodiment, one read response packet 750 is sent by memory 112 for each destination to receive the data.

The source address field 752 may contain the memory address from which the data was read. In one embodiment, the consumer processing unit uses this in order to create an entry in an embodiment of the local read storage 108 in which each entry contains a an address from memory 112 and the data from that address. This may be referred to as a CAM embodiment.

The destination address field 754 contains the destination to receive the data. This may be a unique identifier of a consumer processing unit 106, master processing unit 102, or, a location in memory 112.

The burst start bit 756 may be asserted high to indicate this is the first data packet in a burst.

The burst end bit 758 may be asserted high to indicate this is the last data packet in a burst.

The data field 760 contains the data that was requested from the memory 112.

Figure 8A:
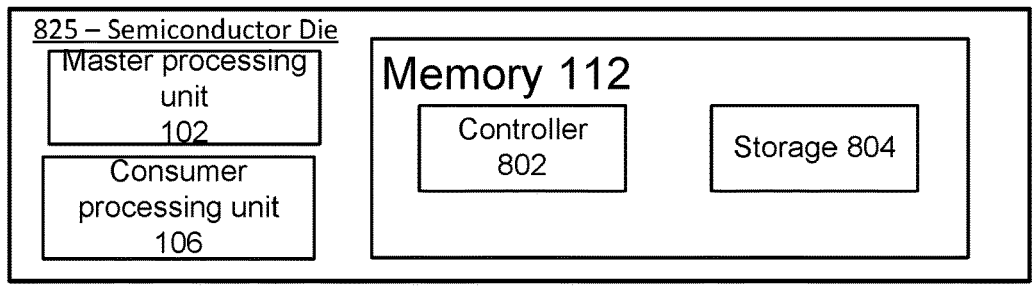
FIG. 8A is a diagram of one embodiment of a semiconductor die having memory, a consumer processing unit, and a master processing unit.

FIG. 8A is a diagram of one embodiment of a semiconductor die 825 having memory 112, a consumer processing unit 106 and a master processing unit 102. The memory 112 of FIG. 8A is contained within an integrated circuit (or semiconductor die) 825 that comprises at least one consumer processing unit 106 and the master processing unit 102, in one embodiment. Storage 804 may be any of a wide range of storage technologies including, but not limited to, random access memory (SRAM), dynamic random access memory (DRAM), synchronous DRAM (SDRAM), read-only memory (ROM), or a combination thereof. Note that in another embodiment, the master processing unit 102 is on the same integrated circuit 825 as memory 112, but the consumer processing unit 106 is not on the same integrated circuit 825 as memory 112. Note that in another embodiment, the consumer processing unit 106 is on the same integrated circuit 825 as memory 112, but the master processing unit 102 is not on the same integrated circuit 825 as memory 112.

The controller 802 is configured to process read requests and provide data from storage 804, in one embodiment. For example, controller 802 may be configured to process read request packet 700 and provide data from storage 804 in a read response packet 750.

Controller 802 may include, for example, one or more state machines, page registers, SRAM, and control circuitry for controlling the operation of memory 112. Controller 802 and storage 804 reside on the same integrated circuit, in one embodiment. Controller 802 and storage 804 reside on different integrated circuits, in one embodiment. For example controller 802 and storage 804 may be formed on different integrated circuits that reside on the same printed circuit board.

Figure 8B:
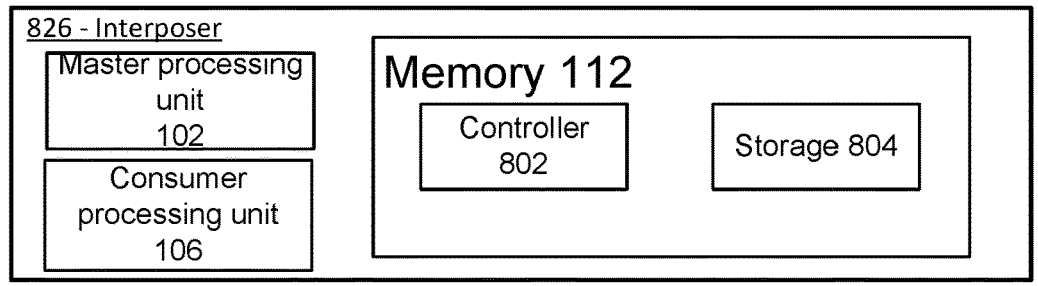
FIG. 8B is a diagram of one embodiment of a system having memory, a consumer processing unit, and a master processing unit.

FIG. 8B is a diagram of one embodiment of a system having memory 112, a consumer processing unit 106 and a master processing unit 102. The memory 112 of FIG. 8B does not reside on the same semiconductor die as the master processing unit 102 and/or a consumer processing unit 106 with which it communicates. In this embodiment, there is an interposer 826 on which the memory 112, master processing unit 102 and consumer processing unit 106 reside. Interposer 826 provides a common mounting surface and electrical coupling point for memory 112, consumer processing unit 106 and master processing unit 102. In one embodiment, memory 112 is on a different die than master processing unit 102 and/or consumer processing unit 106. The consumer processing unit 106 and master processing unit 102 might or might not be on the same semiconductor die. Interposer 826 serves as an intermediate layer for interconnect routing (not shown) between memory 112 and the master processing unit 102 and/or a consumer processing unit 106. Interposer 826 can be implemented with a silicon wafer substrate, whether doped or un-doped with an N-type and/or a P-type impurity. Interposer 826 can include one or more layers of metal interconnect, and one or more dielectric or insulating layers. Interposer 826 can be implemented as a passive die that does not includes active circuit elements, or may include active circuit elements (e.g., transistor devices and/or diode devices). Note that in another embodiment, memory 112 and master processing unit 102 are on the same interposer, but consumer processing unit 106 is not on that interposer. Note that in another embodiment, memory 112 and consumer processing unit 106 are on the same interposer, but master processing unit 102 is not on that interposer.

Figure 8C:
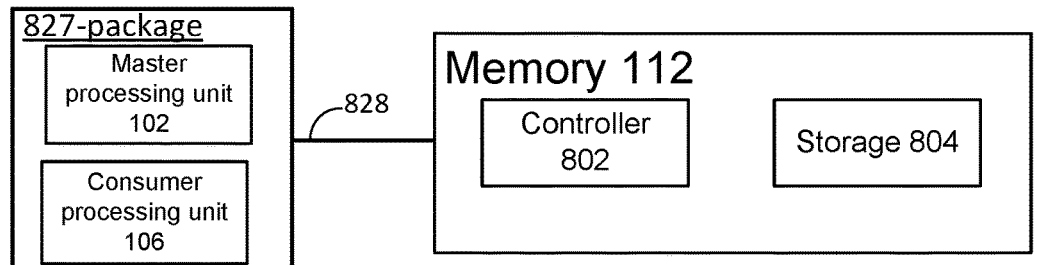
FIG. 8C is a diagram of one embodiment of a system having memory, a consumer processing unit, and a master processing unit.

FIG. 8C is a diagram of one embodiment of a system having memory 112, a consumer processing unit 106 and a master processing unit 102. In this embodiment, the consumer processing unit 106 and master processing unit 102 are on the same package 827, but memory 112 is not in that package 827. The master and consumer may or may not be on the same die in the package 827. There is an external interface 828 with which to communicate between the memory 112 and the master processing unit 102 and/or a consumer processing unit 106 on package 827. The external interface 828 may include, but is not limited to, a PCIe (Peripheral Component Interconnect Express) bus, AXI (Advanced eXtensible Interface) bus, Ethernet connection (wired or wireless). The memory 112 could be random access memory (SRAM), dynamic random access memory (DRAM), synchronous DRAM (SDRAM), read-only memory (ROM) that is on a separate integrated circuit from the master processing unit and/or a consumer processing unit with which it communicates. The memory 112 could be a solid state drive, hard disk drive, magnetic disk drive, optical disk drive, or the like. Note that the consumer processing unit 106 and master processing unit 102 do not need to be on the same package 827.

Figure 8D:
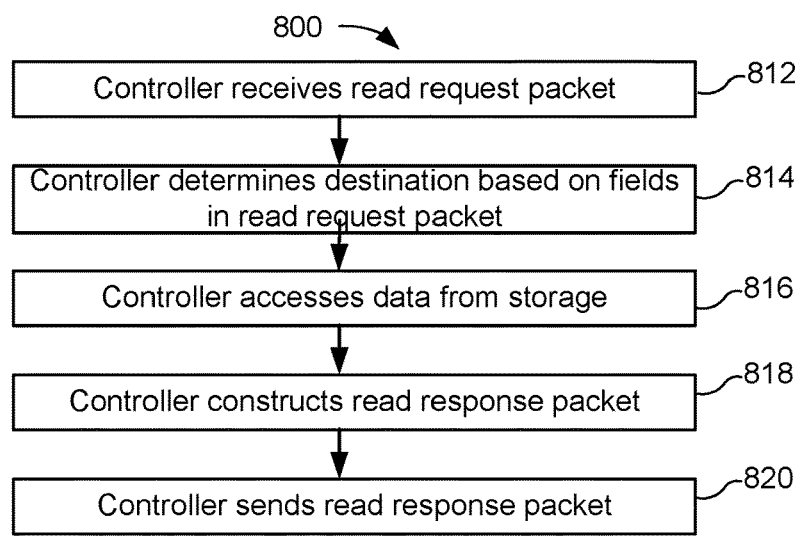
FIG. 8D is a flowchart of one embodiment of a process of the memory responding to a read request packet.

FIG. 8D is a flowchart of one embodiment of a process 800 of the memory 112 responding to a read request packet 700. Process 800 could be performed by memory 112 of FIGS. 1, 2, 8A, 8B, but is not limited thereto. The process 800 will be discussed with respect to the example packets 700, 750. In step 812, the controller 802 receives read request packet 700.

In step 814, the controller 802 determines a destination for the data based on one or more fields in the read request packet 700. For example, the controller 802 analyzes field 704 and 706 in packet 700.

In step 816, the controller 802 accesses data from the storage 804. For example, the controller 802 analyzes field 702 in packet 700 to determine the address of the data to be accessed.

In step 818, the controller 802 constructs a read response packet 750. For example, controller 802 forms the various fields depicted in FIG. 7B.

In step 820, the controller 802 provides the read response packet 750 onto a communication path. For example, the controller 802 provides the read response packet 750 onto communication path 116.

Figure 9:
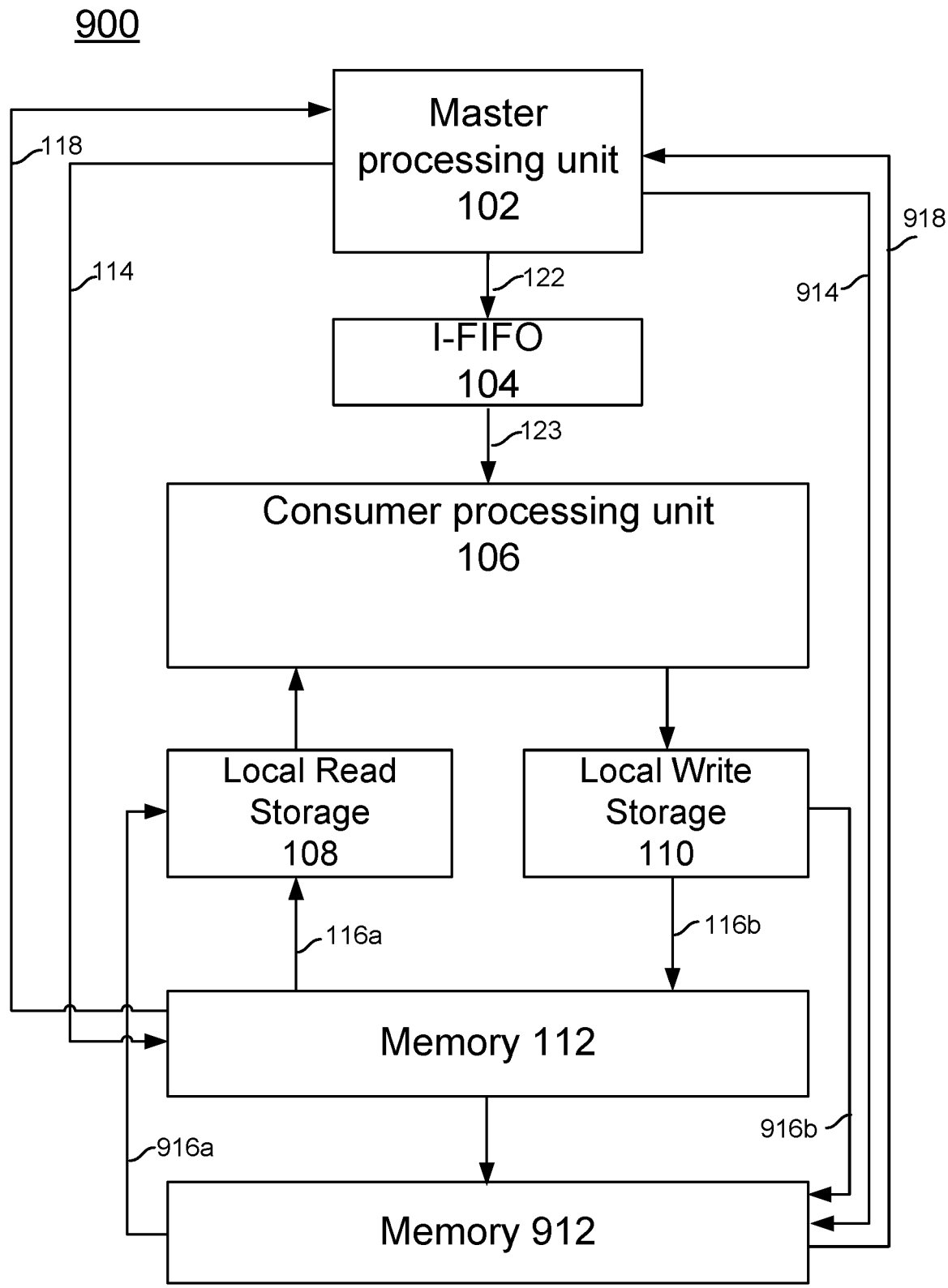
FIG. 9 is a diagram of one embodiment of computer system.

FIG. 9 is a diagram of one embodiment of computer system 900. System 900 is similar to system 100 in FIG. 1, but also depicts memory 912. In computer system 900 there are two different memory levels with memory 112 being a first level and memory 912 being a second level. System 900 also depicts some additional communication paths 916a, 916b, 914, and 918.

Communication path 914 allows the master processing unit 102 to send an address to memory 912. The communication path 914 is an internal bus, in one embodiment. The communication path 914 has a signal line for each bit to be transferred, in one embodiment. The communication path 914 may be configured to transfer one word at a time, as one example. The communication path 914 is used as an address bus, in one embodiment. The communication path 914 is a uni-directional address bus, in one embodiment.

Communication path 916 allows data to be transferred between memory 912 and the consumer processing unit 106, in one embodiment. The communication path 916 is used as a data bus, in one embodiment. The communication path 916 is depicted as having a path 916a from the memory 912 to the local read storage 108 and a path 916b from the local write storage 110 to the memory 912. In one embodiment, the communication path 916 is a bi-directional data bus. Thus, the same signal lines may be used for communication path 916a and communication path 916b. The communication path 916 is an internal bus, in one embodiment. The communication path 916 has a signal line for each bit to be transferred, in one embodiment. The communication path 916 may be configured to transfer one word at a time, as one example.

Communication path 918 may be used to send machine instructions from the memory 912 to the master processing unit 102. The master processing unit 102 may request such machine instructions by specifying an address of the machine instruction in memory 912 along communication path 914. In one embodiment, memory 912 sends the machine instruction to the master processing unit 102 along communication path 918. The communication path 918 is an internal bus, in one embodiment. The communication path 918 has a signal line for each bit to be transferred, in one embodiment. The communication path 918 may be configured to transfer one word at a time, as one example. The communication path 918 is used as a data bus, in one embodiment.

The master processing unit 102 may first send a read request to memory 112 for data needed to execute a machine instruction. If memory 112 does not contain the data, then the master processing unit 102 may send a read request to memory 912. Note that even with the delay of needing to make the second read request, the data from memory 912 can still be provided to the local read storage 108 by the time that the consumer processing unit 106 is ready to execute the associated machine instruction.

FIG. 10 is a flowchart of one embodiment of a process 1000 of hazard block operation. In step 1004, the consumer processing unit 106 attempts a read of local read storage 108 for data associated with an instruction it accessed from I-FIFO. Step 1006 is a determination of whether the data has arrived yet in the local read storage. If the data has not yet arrived in the local read storage, then the consumer processing unit 106 waits for the data to arrive in the local read storage (step 1008). Once the data has arrived in the local read storage 108, then the process 1000 continues at step 1010.

Step 1010 includes checking the local write storage 110 to determine whether the local write storage contains an updated copy of the data. If not, then the data from the local read storage 108 is returned in step 1012. If the local write storage has an updated copy (step 1010=yes), then the updated copy is returned to the consumer processing unit (step 1014). Also, the old entry is removed from the local read storage 108 (step 1014). In one embodiment, the local write storage 110 stores a memory address with each data entry. This address can be compared with a memory address associated with the read address in step 1010. If there is a match, then the copy from local write storage 110 may be returned in step 1014.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, device having one or more processors executing instructions stored in non-transitory memory, a computer-implemented method, and/or non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A method comprising:
   receiving, by a memory device, a read request from a master processing unit, the read request requesting data for executing a machine instruction that is assigned for joint processing by the master processing unit and a consumer processing unit, wherein the master processing unit partially decodes a first portion of the machine instruction to generate decoded information including a decoded opcode and a decoded address of an operand of the machine instruction, and wherein the master processing unit stores the decoded information in an instruction queue connected to the consumer processing unit;
   sending, by the memory device in response to the read request, the data for executing the machine instruction over a first communication path to a local read storage of the consumer processing unit, wherein the consumer processing unit executes a second portion of the machine instruction based on the data from the memory device and the decoded information stored in the instruction queue by the master processing unit; and
   receiving, by the memory device, write data resulting from execution of the machine instruction over a second communication path from a local write storage of the consumer processing unit and storing the data in the memory device, the second communication path extending over a separate data bus than a data bus over which the first communication path extends.

2. The method in accordance with claim 1, further comprising:
   receiving, by the local read storage of the consumer processing unit, the data for executing the machine instruction over the first communication path and storing the data for executing the machine instruction in a location of the local read storage of the consumer processing unit;
   executing, by the consumer processing unit, the machine instruction based on the data for stored in the location of the local read storage, thereby generating the write data; and
   storing, by the consumer processing unit, the write data in the local write storage of the consumer processing unit.

3. The method in accordance with claim 1, further comprising:
   sending, by the local write storage, a write request to the memory device over the second communication path, the write request requesting that the write data be stored in the memory device.

4. The method in accordance with claim 1, wherein a plurality of local read storage devices exist and the data for executing the machine instruction is sent from the memory device as a broadcast to a specific group of more than one but less than all local read storage devices.

5. The method in accordance with claim 1, wherein a burst of multiple blocks or words of data for executing the machine instruction are sent over the first communication path to the local read storage device associated with the consumer processing unit.

6. The method in accordance with claim 1, wherein a burst of multiple blocks or words of data are received over the second communication path from the local write storage associated with the consumer processing unit.

7. A main memory device comprising:
   a processor; and
   a non-transitory computer readable storage medium storing programming for execution by the processor, the programming including instructions to:
      receive a read request from a master processing unit, the read request requesting data for executing a machine instruction that is assigned for joint processing by the master processing unit and a consumer processing unit, wherein the master processing unit partially decodes a first portion of the machine instruction to generate decoded information including a decoded opcode and a decoded address of an operand of the machine instruction, and wherein the master processing unit stores the decoded information in an instruction queue connected to the consumer processing unit;
      send, in response to the read request, the data for executing the machine instruction over a first communication path to a local read storage of the consumer processing unit, wherein the consumer processing unit executes a second portion of the machine instruction based on the data from the main memory device and the decoded information stored in the instruction queue by the master processing unit; and receive write data resulting from execution of the machine instruction over a second communication path from a local write storage of the consumer processing unit and storing the data in the main memory device, the second communication path extending over a separate data bus than a data bus over which the first communication path extends.

8. The main memory device of claim 7, wherein a plurality of local read storage devices exist and the data for executing the machine instruction is sent from the main memory device as a broadcast to a specific group of more than one but less than all local read storage devices.

9. The main memory device of claim 7, wherein a burst of multiple blocks or words of data for executing the machine instruction are sent over the first communication path to the local read storage associated with the consumer processing unit.

10. The main memory device of claim 7, wherein a burst of multiple blocks or words of data are received over the second communication path from the local write storage associated with the consumer processing unit.

11. A system comprising:
a consumer processing unit;
a master processing unit, wherein the master processing unit partially decodes a first portion of a machine instruction to generate decoded information including a decoded opcode and a decoded address of an operand of the machine instruction, and wherein the machine instruction is assigned for joint processing by the master processing unit and the consumer processing unit;

an instruction queue connected to the master processing unit and the consumer processing unit, the instruction queue storing the decoded information from the master processing unit; and a main memory device, wherein the main memory device:
receives a read request from the master processing unit, the read request requesting data for executing the machine instruction;
sends, in response to the read request, the data for executing the machine instruction over a first communication path to a local read storage of the consumer processing unit, wherein the consumer processing unit executes a second portion of the machine instruction based on the data from the main memory device and the decoded information stored in the instruction queue by the master processing unit; and
receives write data resulting from execution of the machine instruction over a second communication path from a local write storage of the consumer processing unit and storing the data in the main memory device, the second communication path extending over a separate data bus than a data bus over which the first communication path extends.

* * * * *

UNITED STATES PATENT AND TRADEMARK OFFICE
CERTIFICATE OF CORRECTION

PATENT NO. : 11,334,355 B2
APPLICATION NO. : 15/586937
DATED : May 17, 2022
INVENTOR(S) : Alan Gatherer It is certified that error appears in the above-identified patent and that said Letters Patent is hereby corrected as shown below:

In the Claims

Claim 5, Column 24, Line 41; delete "device" after "storage".

Signed and Sealed this
Fourteenth Day of June, 2022

Katherine Kelly Vidal
Director of the United States Patent and Trademark Office